(12) United States Patent
Nowottnick

(10) Patent No.: US 8,570,144 B2
(45) Date of Patent: *Oct. 29, 2013

(54) FIELD SUPERPOSITION SYSTEM AND METHOD THEREFOR

(75) Inventor: Juergen Nowottnick, Hamburg (DE)

(73) Assignee: NXP B.V., Eindhoven (NL)

( * ) Notice: Subject to any disclaimer, the term of this patent is extended or adjusted under 35 U.S.C. 154(b) by 382 days.

This patent is subject to a terminal disclaimer.

(21) Appl. No.: 13/046,194

(22) Filed: Mar. 11, 2011

(65) Prior Publication Data

US 2012/0229254 A1    Sep. 13, 2012

(51) Int. Cl.
*G05B 19/00*    (2006.01)

(52) U.S. Cl.
USPC ........................................ 340/5.61

(58) Field of Classification Search
USPC ............ 340/5.61, 5.72, 539.13, 10.1; 701/36, 701/49
See application file for complete search history.

(56) References Cited

U.S. PATENT DOCUMENTS

| | | | |
|---|---|---|---|
| 6,218,932 B1 | 4/2001 | Stippler | |
| 6,747,545 B2 | 6/2004 | Nowottnick et al. | |
| 6,937,136 B2 * | 8/2005 | Greenwood et al. | 340/5.61 |
| 6,965,296 B2 * | 11/2005 | Kamlah | 340/5.72 |
| 7,420,455 B2 | 9/2008 | Nowottnick | |
| 7,426,275 B2 | 9/2008 | Sugawara | |
| 7,705,710 B2 * | 4/2010 | Hermann | 340/5.72 |
| 8,069,350 B2 | 11/2011 | Nowottnick | |
| 8,442,719 B1 | 5/2013 | Nowottnick | |
| 2008/0024322 A1 | 1/2008 | Riemschneider et al. | |
| 2012/0229254 A1 | 9/2012 | Nowottnick | |
| 2012/0280788 A1 | 11/2012 | Nowottnick | |

FOREIGN PATENT DOCUMENTS

DE    10131097 A1    1/2003

* cited by examiner

*Primary Examiner* — Vernal Brown

(57) ABSTRACT

Wireless communications between a vehicle base station and a transponder are authenticated. Interior and exterior antennas are respectively driven using first driving currents, the interior antenna being separated from the transponder by a portion of a vehicle in which the vehicle base station resides. Separate vector components of the respective fields emitted by the interior and exterior antennas are received and detected at the transponder. Superposition factors are calculated for the interior and exterior antennas based upon the separate vector components. Each of the interior and exterior antennas is concurrently driven using the same phase, respectively using the driving currents multiplied by the superposition factors. Superposed vector components are detected for a superposed signal including signals from both antennas received at the transponder. The transponder is authenticated based on the detected superposed vector components for the superposed signal being within a noise-based range of the sum of the separate vector components for each of the interior and exterior antennas as multiplied respectively by the superposition factors for the interior and exterior antennas.

20 Claims, 4 Drawing Sheets

FIELD SUPERPOSITION SYSTEM AND METHOD THEREFOR

Aspects of various embodiments of the present invention are directed to wireless communications, and in particular to field superposition in wireless communications for ensuring source security.

Many wireless communication systems employ transponders and base stations that communicate with one another. For example, transponders can be used in automotive applications for passive keyless entry (PKE) for unlocking the doors of a vehicle, or passive keyless go (PKG) for enabling an ignition circuit. Generally, transponders communicate with a base station to unlock doors and/or an automobile ignition, or otherwise enable related circuits.

Unfortunately, such communications systems are susceptible to attacks. For instance, in automobile applications in which a user's transponder is used to unlock and/or enable the ignition of a vehicle, relay devices can be used to relay signals between the transponder and a base station at the vehicle. An attacker can position himself near the vehicle in proximity of the base station, while another attacker positions himself near the user and his/her transponder. Wireless communications between the attackers serve to relay signals between the base station and transponder, and can open and/or otherwise enable the vehicle's ignition.

These and other matters have presented challenges to the design and implementation of wireless systems for a variety of applications.

Various example embodiments are directed to field superposition circuits and their implementation.

According to an example embodiment, wireless communication between a vehicle base station and a transponder is effected as follows. Interior and exterior antennas are driven using first driving currents (e.g., each antenna is driven with a driving current, which may or may not be the same). The interior antenna is separated from the transponder by a portion of a vehicle in which the vehicle base station resides, and its signal is correspondingly passed via the vehicle. Separate vector components of the respective fields that are emitted by the interior and exterior antennas and received at the transponder, are detected and superposition factors for the interior and exterior antennas are calculated based upon the separate vector components. The interior and exterior antennas are concurrently driven using the same phase, respectively using the first driving currents multiplied by the superposition factors. Superposed vector components are detected for a superposed signal including signals from both antennas received at the transponder. The transponder is authenticated in response to the detected superposed vector components being within an error tolerant range of the sum of the separate vector components for each of the interior and exterior antennas as multiplied respectively by the superposition factors for the interior and exterior antennas.

Another example embodiment is directed to wirelessly communicating between a vehicle base station and a transponder. Interior and exterior antennas are respectively driven using transmission currents $I_I$ and $I_O$, with the interior antenna being separated from the transponder by a portion of a vehicle in which the vehicle base station resides. At the transponder, $x_I$, $y_I$ and $z_I$ vector components of the field strength emitted by the interior antenna are measured, as are $x_O$, $y_O$ and $z_O$ vector components of the field strength emitted by the exterior antenna. A signal indicative of the measured vector components is transmitted to the vehicle base station. At the vehicle base station, superposition factors n and m are calculated for respectively applying to the measured signals from the interior and exterior antennas, based upon the transmitted signal indicative of the measured vector components, the superposition factors are encrypted, and the encrypted superposition factors are transmitted to the transponder. Signals from each of the interior and exterior antennas are concurrently transmitted to the transponder using the same phase, respectively using transmission currents $I_I*n$ and $I_{O1}*m$. At the transponder, $x_S$, $y_S$ and $z_S$ vector components are measured from a superposed signal including the signals from both antennas, and the transponder is authenticated in response to each of $x_S$, $y_S$ and $z_S$ respectively being within an error tolerant range of the sum of the respective vector components of signals from each of the interior and exterior antennas, multiplied by the superposition factors.

Other embodiments are directed to a system for authenticating a wireless communication. In one embodiment, such a system includes one or both of a transponder and a vehicle base station as follows. The transponder receives and detects separate vector components of respective fields emitted by interior and exterior antennas of a vehicle, the interior antenna being separated from the transponder by a portion of the vehicle. The vehicle base station drives the interior and exterior antennas respectively using first driving currents for communicating with the transponder, and concurrently drives each of the interior and exterior antennas using the same phase, respectively using the driving currents multiplied by superposition factors calculated for the interior and exterior antennas based upon the separate vector components. The transponder detects superposed vector components of a superposed signal, including signals from both antennas received at the transponder. The vehicle base station authenticates the transponder in response to the detected superposed vector components for the superposed signal being within an error tolerant range of the sum of the separate vector components for each of the interior and exterior antennas as multiplied respectively by the superposition factors for the interior and exterior antennas.

The above discussion/summary is not intended to describe each embodiment or every implementation of the present disclosure. The figures and detailed description that follow also exemplify various embodiments.

Various example embodiments may be more completely understood in consideration of the following detailed description in connection with the accompanying drawings, in which.

Figure 1:
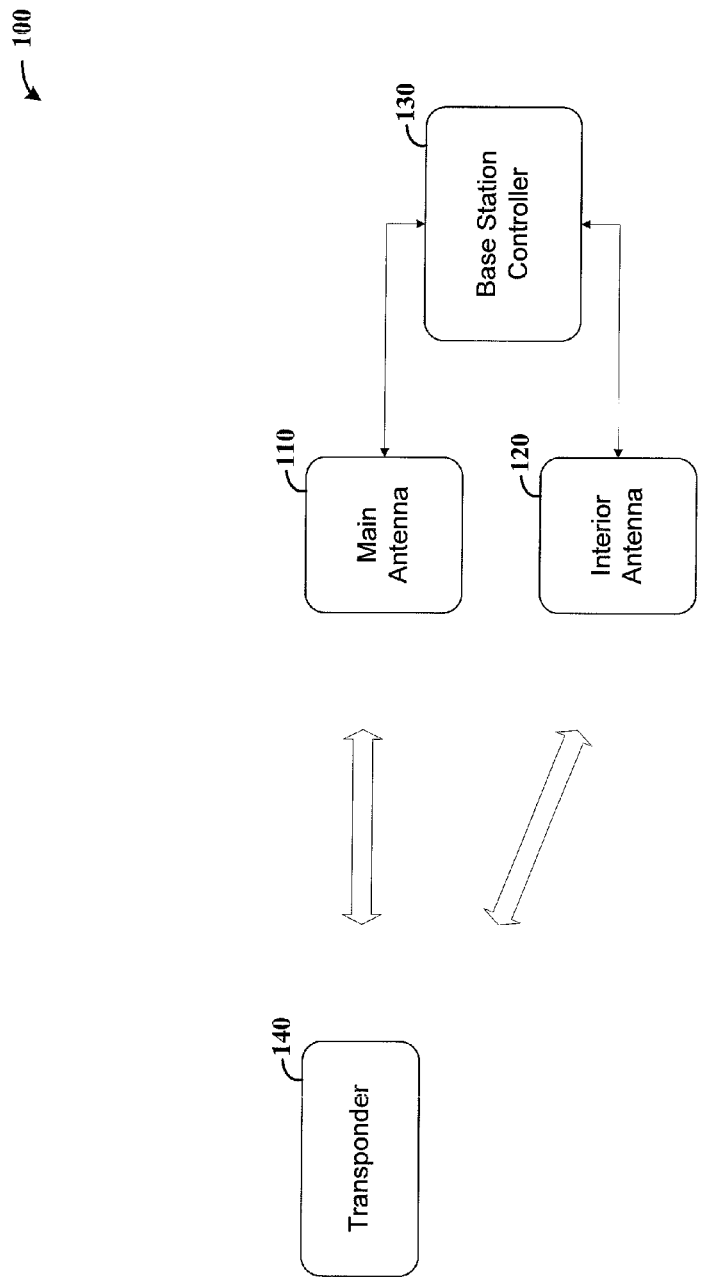
FIG. 1 shows a wireless system with field superposition, in accordance with an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention including aspects defined in the claims. In addition, the term "example" as used throughout this application is only by way of illustration, and not limitation.

Aspects of the present invention are believed to be applicable to a variety of different types of devices, systems and arrangements for field superposition involving transponder-base station coupling, including those involving automotive applications. While the present invention is not necessarily so limited, various aspects of the invention may be appreciated through a discussion of examples using this context.

Various example embodiments are directed to field superposition circuits and methods that address challenges, such as those identified in the background above. In accordance with one or more embodiments, factors corresponding to a superposed field are provided with a signal presented to a remote transponder, and used in verifying the authenticity and/or proximity of a corresponding response of the transponder for operating a circuit, such as an unlocking mechanism and/or an ignition mechanism for a vehicle. Such applications may, for example, be implemented with passive keyless entry (PKE) or passive keyless go (PKG) applications in the automotive realm.

In a more particular example embodiment, a superposed field is used in connection with the communication of information from a base station to a transponder via two (or more) vehicle antennas in an external antenna and an internal antenna. When a transponder is in proximity of the vehicle, the antennas pass a signal to the transponder for communicating therewith. The transponder responds to the signals by providing another signal that is detected by the antennas. The base station applies a value to those signals passed from the antenna to the transponder. The superposed signals are analyzed (e.g., at the transponder and/or the base station), and the base station authenticates the communication/transponder based upon the analysis. This authentication can initially be used to determine that the transponder returning a signal is also receiving the signal from the antennas (e.g., that there is no relay), which can be followed with additional authentication that the transponder is appropriate for the vehicle (e.g., via subsequent encrypted communications). This authentication can be used, for example, to operate or enable a system, such as an entry/locking mechanism or an ignition mechanism.

The internal antenna is placed relative to the vehicle such that the combination of the antenna and the body of the vehicle affect the signal presented by the internal antenna. In this context, the body of the car is used together with the antenna to provide a combined signal source that is difficult to match or otherwise identify. For instance, replicating such a combined antenna-type arrangement could require replication of the vehicle structure. Accordingly, various embodiments are directed to using the antenna placement with the vehicle to generate a signal that is difficult to replicate (e.g., masked by the vehicle body), as in generating an in-homogenous field.

In some implementations, the base station generates signals using vector components of the field presented by the antennas as received at the transponder and communicated back to the base station as follows. The received signal strength indicator (RSSI) is measured for vector components (x, y, z) of the received field strength emitted by an external antenna at a transmission current $I_O$, to obtain a signal having vector components ($x_O$, $y_O$, $z_O$). The RSSI is also measured for vector components (x, y, z) of the received field strength emitted by an internal antenna, at transmission current $I_I$, to obtain a signal having vector components ($x_I$, $z_I$). These RSSI measurements can be carried out using proportional field strengths, for reception at a common transponder position. The results ($x_O$, $y_O$, $z_O$ and $x_I$, $y_I$, $z_I$) are encrypted and transmitted back to the base station using, for example, ultra high frequency (UHF) communications.

At the base station, factors m and n to be applied to exterior and interior antenna signals in generating a superposed signal are calculated as follows. A randomly-superposed field strength is applied, such that:

$$[x_O*m, y_O*m, z_O*m] \sim [x_I*n, y_I*n, z_I*n + \text{random value}].$$

The superposed (phase adjusted) field strength can be set such that it is safely above an expected noise level:

$$[x_O*m, y_O*m, z_O*m] + [x_I*n, y_I*n, z_I*n] > \text{noise level}.$$

The calculated values for n and m are encrypted and transmitted to the transponder, such as by using UHF or low frequency (LF) signals.

The base station activates the exterior and interior antennas at the same time with the same phase. The transmission current of the transmitter is adjusted for each antenna such that:

$$I_{O,m} = I_O * m \text{ (external antenna)}$$

$$I_{I,n} = I_I * n \text{ (internal antenna)}$$

The transponder or base station evaluates the following conditions based on the received (measured) vector components (superposed), transmitted by both antennas ($x_{super}$, $y_{super}$, $z_{super}$):

$$x_O*m + x_I*n - dx < x_{super} < x_O*m + x_I*n + dx \quad (a)$$

$$y_O*m + y_I*n - dy < y_{super} < y_O*m + y_I*n + dy, \text{ and} \quad (b)$$

$$z_O*m + z_I*n - dz < z_{super} < z_O*m + z_I*n + dz, \quad (c)$$

with dx, dy and dz factors corresponding to expected errors, such as those due to phase jitter, measurement accuracy, and driver current accuracy. If all conditions a-c are true, it is determined that the transponder is in front of a valid vehicle. If conditions a-c are not all true, a relay attack is detected (e.g., the inserted relays could not create the expected vector components of the magnetic field produced by the antennas).

In some implementations, a single-relay attack is detected as follows. The measured vector components ($x_{O1}$, $y_{O1}$, $z_{O1}$) and ($x_I$, $y_I$, $z_I$) are normalized as follows:

$$[x_O, y_O, z_O]/\text{MAX}[x_O, y_O, z_O]*100\% = [x_{Onorm}, y_{Onorm}, z_{Onorm}], \text{ and}$$

$$[x_I, y_I, z_I]/\text{MAX}[x_I, y_I, z_I]*100\% = [x_{Inorm}, y_{Inorm}, z_{Inorm}]$$

Using these normalizations, if $$[x_{O1norm} - x_{Inorm}] < dx \text{ AND}$$

$$[y_{O1norm} - y_{Inorm}] < dy \text{ AND}$$

$$[z_{O1norm} - z_{Inorm}] < dz,$$

where dx, dy, dz are determined by the errors due to phase jitter, measurement accuracy, driver current accuracy, a single 1D coil based EMU attack is detected and the process is stopped. This single coil based relay attack can thus be detected without necessarily normalizing the vector components and carrying out the related additional steps above.

In accordance with another example embodiment, a wireless system includes a base station that communicates with a remote transponder via two or more antennas local to the base station, with one of the antennas being arranged such that its signal is at least partially hidden or obstructed from the remote transponder (e.g., within a vehicle that distorts the signal from the antenna). The base station superposes a field upon signals passed via the antennas using field strength factors corresponding to each antenna. The signals are transmitted to the remote transponder via the antennas in phase and at the same time, along with the field strength factors (e.g., encrypted). The base station further analyzes signals received from the transponder to verify one or more of the authenticity and proximity of the transponder, using the field strength factors.

In more particular example embodiments, a system as discussed above is implemented with three or more antennas, including interior and exterior antennas as discussed, as well as an additional exterior antenna. The second exterior antenna can be used to hide or otherwise mitigate the accurate detection of a signal from the interior antenna.

In another embodiment, the base station tracks the number of unsuccessful access tries (e.g., for personal keyless entry (PKE)) and temporarily or permanently disables a corresponding system. This approach can be used to mitigate trial and error relay attacks.

In accordance with the above examples, some embodiments are directed to systems including a base station, transponder and antennas including an interior and exterior vehicle antenna. Other embodiments are directed to subcomponents of such a system. For instance, various embodiments are directed to a base station configured to operate in accordance with the above, to generate signals, encrypt field strength factors, and communicate with a transponder. The base station may compare superposed fields as detected by a transponder and communicated to the base station, for authenticating the transponder. Another example embodiment is directed to a transponder that receives and communicates signals as discussed above, and may compare superposed fields as discussed above using field strength factors received from a base station.

Various embodiments of the present invention can be applied to a multitude of different applications. As consistent with the discussion herein, one or more embodiments may be implemented with a variety of different types of passive keyless entry or passive keyless go systems. For example, methods, systems, base stations or transponders as discussed herein may be implemented in connection with components and/or all of a transponder system such as described in U.S. Patent Publication No. 2008/0024322, or in U.S. Pat. No. 7,426,275, which are fully incorporated herein by reference.

Turning now to the figures, FIG. 1 shows a wireless system 100 with field superposition, in accordance with an example embodiment of the present invention. The system 100 includes a main antenna 110 and interior antenna 120, which pass signals from a base station/controller 130 to a remote transponder 140. The interior antenna 120 is shielded, such as by a vehicle shell or other component, from direct access by the transponder 140.

The base station 130 drives the main and interior antennas 110 and 120, and the transponder 140 detects the signals from the antennas, including vector components for each signal. The transponder communicates encrypted information characterizing these detected signals back to the base station 130, which uses the information to generate field superposition factors for use in driving each antenna. The base station 130 further encrypts and sends the superposition factors to the transponder 140.

The base station 130 then applies the respective superposition factors to drive each antenna at the same time, in-phase. The transponder detects the superposed signal, which is used together with the superposition factors to determine whether the superposed signal, including a combined signal from each antenna, is within an error factor. In some implementations, the superposed signal is authenticated by determining whether each of three vector components (e.g., x, y and z) is within an error factor for that vector. If the combined signal is within the error factor, the transponder is authenticated. This authentication can be used, for example, to operate or enable a system, such as an entry/locking mechanism or an ignition mechanism. In addition, calculations for authenticating the signal (e.g., as in accordance with the equations above) can be made at one or both of the transponder and the base station, with the transponder communicating information characterizing the received signals to the base station for such a calculation in the latter example.

Figure 2:
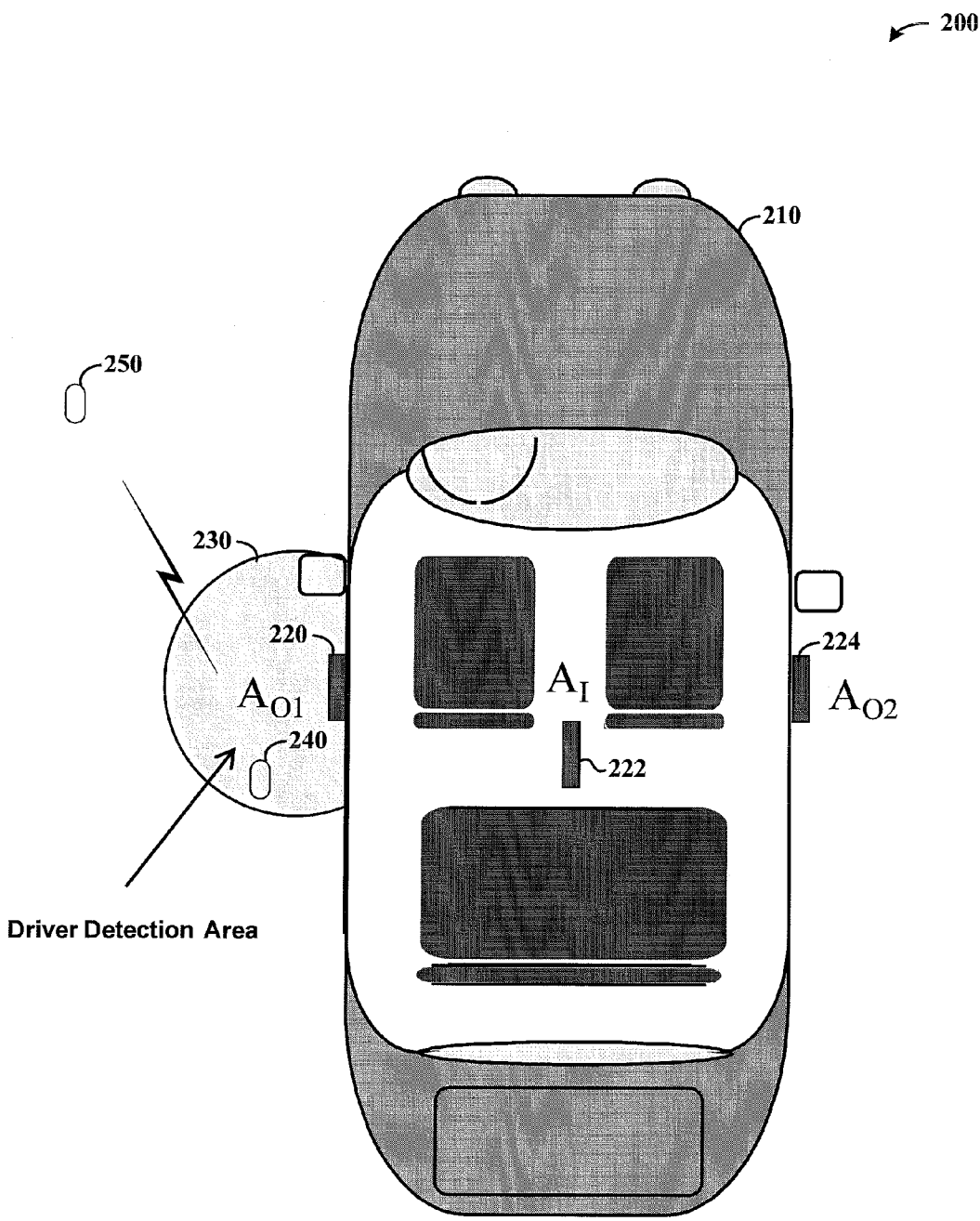
FIG. 2 shows a wireless automotive system with field superposition, in accordance with another example embodiment of the present invention.

FIG. 2 shows a wireless automotive system 200 with field superposition, in accordance with another example embodiment of the present invention. The system 200 includes a base station within a vehicle 210, an external antenna 220 and an internal antenna 222. Shown but optional, a second external antenna 224 is located opposite the external antenna 220, relative to the vehicle 210. The positioning of the respective antennas can be varied to suit different embodiments and application to different types of vehicles 210, with both the vehicle and the antenna positioning being exemplary of a multitude of vehicles and antenna configurations (with the internal antenna 222 being shielded).

The external antenna 220 and internal antenna 222 are configured to transmit a signal that is detectable by a transponder within the indicated driver detection area 230. When used, the second external antenna 226 is also configured to transmit a signal to a transponder within the driver detection area 230.

The vehicle 210 shields the interior antenna 222 from an external transponder, such hat a signal from the interior antenna is not directly detectable by a transponder in the driver detection area 230. For example, glass, metal or other components of the vehicle 210 may distort the signal sent by the interior antenna 222, such that the transponder does not directly detect the signal as generated at the antenna.

By way of example, a transponder 240 is shown placed in the driver detection area 230, representing an exemplary interaction with the system 200. Optionally, the transponder 240 is part of the system, and operates to communicate signals with the base station in the vehicle 210, via one or both antennas 220 and 222 (or 224 where implemented).

The base station (e.g., a circuit within the vehicle 210) drives the antennas 220 and 222 at an initial transmission current for each antenna (e.g., the currents may be different, with the antennas subsequently driven). Signals with respective vector components corresponding to each antenna 220 and 222 are detected at a transponder (such as 240) and sent back (e.g., encrypted) to the base station in vehicle 210. The base station uses the detected vector components for each antenna 220 and 222, together with a random field strength value (high enough to account for noise/errors), to generate field strength factors to apply to respective signals used to subsequently drive each of the antennas.

The base station then drives the antennas 220 and 222, at the same time and with the same phase, with a current, for each antenna, that respectively corresponds to the initial current previously applied to that antenna, multiplied by the field strength factor for that antenna. The superposed signal detected at the transponder is processed with error data corresponding to the respective antennas, and the known field strength factors for each antenna to determine a condition of authenticity of the transponder. Such authenticity may be determined, for example, as determining whether the transponder receiving and processing the signal is in the driver detection area 230, or has received a signal in this detection area as detected by a relaying transponder. For instance, where transponder 240 is a relaying transponder, and a transponder 250 is actually authenticated for the vehicle 210 but is out of the driver detection area 230, the relaying transponder 240 is incapable of generating the fields from each antenna with respective vector values.

Figure 3:
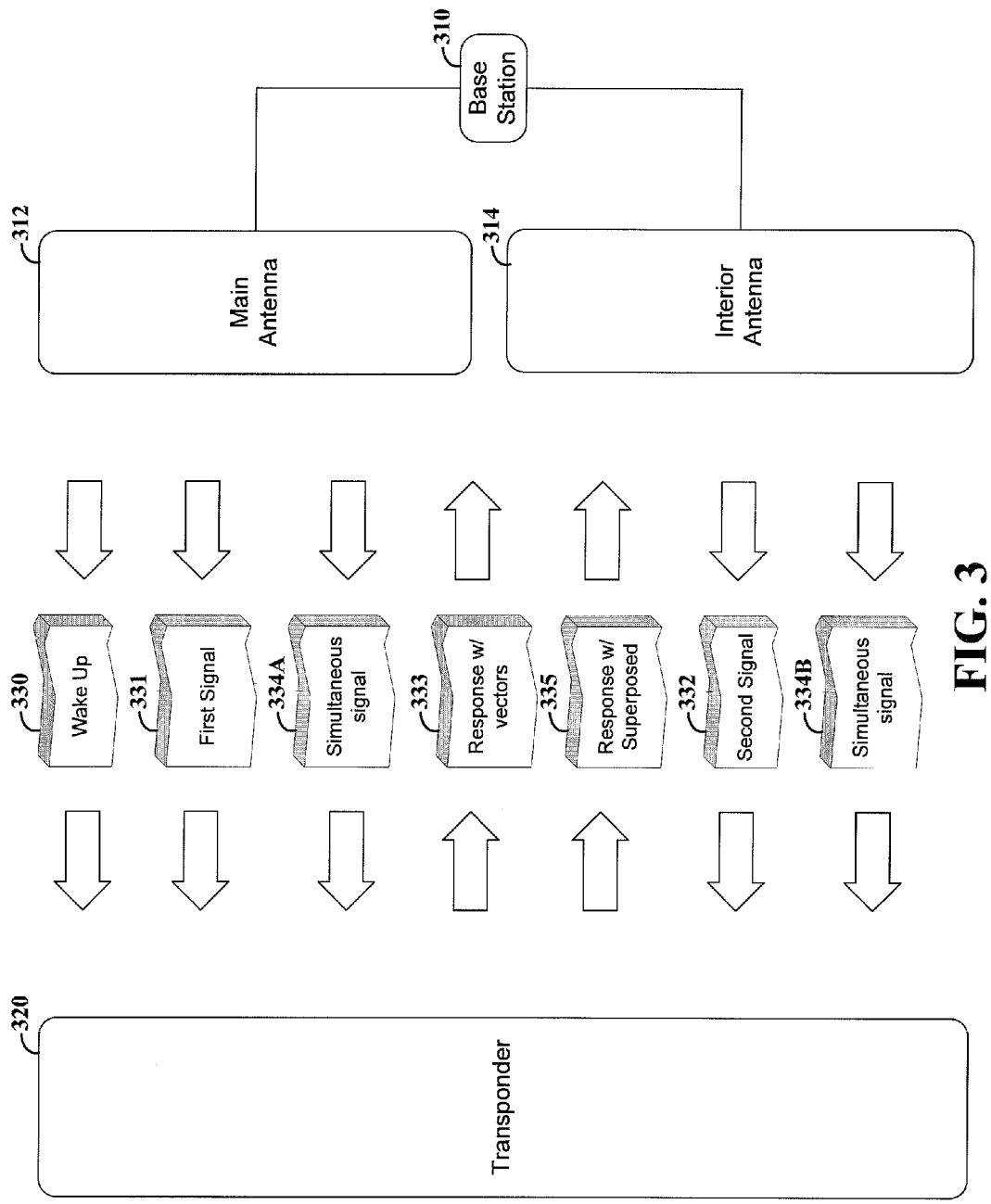
FIG. 3 shows a system and related data flow for transponder authentication, in accordance with another example embodiment of the present invention.

FIG. 3 shows a system 300 and related data flow for transponder authentication, in accordance with another example embodiment of the present invention. The system includes a base station 310 as well as a main antenna 312 and an interior antenna 314 that the base station respectively drives for communicating with a transponder 320. The base station 310 drives the main antenna 312 to send a wake-up signal 330 to the transponder 320, and subsequently to send a first signal 331 that is detected at the transponder 320 for determining vector components thereof. The base station 310 then drives the interior antenna 314 to send a second signal 332 that is also detected at the transponder 320, for determining vector components of the second signal.

The transponder 320 sends a response signal 333 that includes information characterizing the respective vector components detected via the first and second signals, to the base station 310 (e.g., via the main antenna 312). The base station uses the vector components and a random value to calculate superposition factors for each antenna using one or more approaches as discussed herein. Using these superposition factors, the base station drives the main and interior antennas simultaneously to produce simultaneous signals 334A and 334B.

The transponder 320 detects these simultaneous signals as a superposed signal and determines vectors thereof. The transponder 320 sends a response signal 335 including information characterizing the superposed signals, for each signal provided by the main and interior antennas. This step may involve, for example, using encrypted superposition factors sent with one or both of the simultaneous signals 334A and 334B to the transponder 320, to respectively determine the components of the superposed signal attributable to the respective antennas.

Various communications as shown in FIG. 3 may be implemented using one or both of the disparate main and internal antennas 312 and 314. For instance, the wake-up signal 330 may be sent by either the main or internal antenna. Similarly, signals sent from the transponder 320 for use at a base station 310 may be sent via either the main or internal antennas 312 and 314. In addition, the communications between the antennas and the transponder can be effected using different types of communications mediums. For instance, a LF signal can be sent from the antennas to the transponder, and the transponder may communicate back to the base station via the antennas using a UHF signal, or either all LF or all UHF signals can be used.

Figure 4:
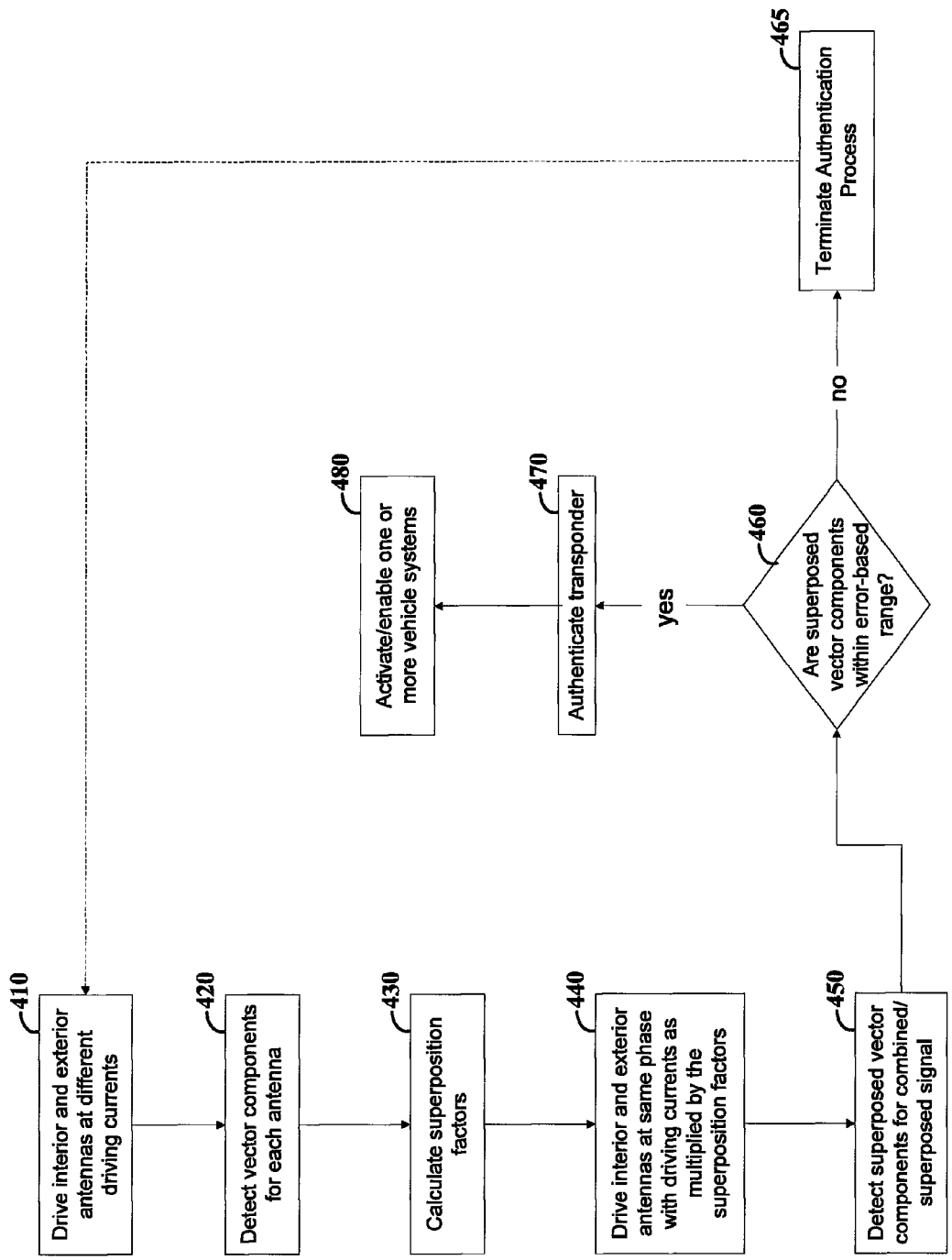
FIG. 4 shows a data flow diagram for wireless authentication with field superposition, in accordance with an example embodiment of the present invention.

FIG. 4 shows a data flow diagram for wireless authentication with field superposition, in accordance with an example embodiment of the present invention. At block 410, interior and exterior antennas are respectively driven using first driving currents (e.g., a different current for each antenna, at different times), with the interior antenna being separated from the transponder by a portion of a vehicle in which the base station resides. At block 420, separate vector components are detected for each of the respective fields emitted by the interior and exterior antennas and received at the transponder.

At block 430, superposition factors are calculated for the interior and exterior antennas based upon the separate vector components, and each of the interior and exterior antennas are driven at the same time using the same phase at block 440, respectively using the driving currents multiplied by the superposition factors. At block 450, superposed vector components are detected for a superposed signal including signals from both antennas received at the transponder.

If the detected superposed vector components are within an error-based range of the sum of the separate vector components for each of the interior and exterior antennas (as multiplied respectively by the superposition factors for the interior and exterior antennas) at 460, the transponder is authenticated at block 470. In some implementations, one or more circuits are enabled in the vehicle at block 480, based upon the authentication at block 470. Such circuits may include, for example, an entry circuit that unlocks a door to the vehicle, an ignition circuit that unlocks an ignition for starting the vehicle, or another locking circuit such as a brake-lock circuit or a fork-lock circuit for a motorcycle that mitigates driving of the vehicle when engaged.

If the detected superposed vector components are not within the error-based range at 460, the authentication process terminates at 465. In some implementations, the authentication process is permitted to re-start at block 410 under certain conditions as represented by a dashed line between blocks 465 and 410. For instance, the process may be re-started at block 410 while using a counter or other approach to track a number of unsuccessful authentication attempts. After a predefined number of unsuccessful attempts have been made (e.g., as limited to a particular time period), the process termination at block 465 does not permit with a re-start at block 410 until after a predefined time period has expired or another reset condition has been met. Other steps, such as an automatic notification to a user of such attempts (e.g., via mobile device such as via text messaging to a mobile telephone, or via another type of alert) can also be initiated upon process termination and/or a termination after the predefined number of unsuccessful attempts has been met.

Based upon the above discussion and illustrations, those skilled in the art will readily recognize that various modifications and changes may be made to the present invention without strictly following the exemplary embodiments and applications illustrated and described herein. For example, additional antennas can be used, different communication types can be used between the antennas, and different approaches to applying field strength factors to signals passed to the transponder can be used. These approaches can be implemented in connection with the detection of fields from each antenna to determine whether the transponder actually authorized to operate a base station-located circuit within the appropriate proximity of the antennas, as relative to the vector values of signals detected by the antennas. Such modifications do not depart from the true spirit and scope of the present invention, including that set forth in the following claims.

What is claimed is:

1. A method of wireless communication between a vehicle base station and a transponder, the method comprising:
   driving interior and exterior antennas using first driving currents, the interior antenna being separated from the transponder by a portion of a vehicle in which the vehicle base station resides;
   detecting separate vector components of the respective fields emitted by the interior and exterior antennas and received at the transponder;
   calculating superposition factors for the interior and exterior antennas based upon the separate vector components;
   concurrently driving the interior and exterior antennas using the same phase, respectively using the first driving currents multiplied by the superposition factors; and detecting superposed vector components of a superposed signal including signals from both antennas received at the transponder; and authenticating the transponder in response to the detected superposed vector components being within an error-based range of the sum of the separate vector components for each of the interior and exterior antennas as multiplied respectively by the superposition factors for the interior and exterior antennas.

2. The method of claim 1, wherein calculating superposition factors includes calculating factors for the external and internal antennas, the product of the factor for the external antenna and the separate vector components for the external antenna being equal to the sum of a random value plus the product of the factor for the internal antenna and the separate vector components for the internal antenna.

3. The method of claim 1, wherein authenticating the transponder includes enabling at least one of an ignition circuit and an entry circuit in the vehicle.

4. The method of claim 1, wherein authenticating the transponder includes transmitting, from the transponder, the detected superposed vector components to the vehicle base station, and authenticating the transponder at the vehicle base station.

5. The method of claim 1,
wherein concurrently driving each of the interior and exterior antennas using the same phase includes encrypting and transmitting the superposition factors to the transponder,
wherein authenticating the transponder includes detecting and using the encrypted superposition factors at the transponder, to determine whether the superposed vector components are within said error-based range of the sum of the separate vector components for each of the interior and exterior antennas.

6. A method for wirelessly communicating between a vehicle base station and a transponder, the method comprising:
driving interior and exterior antennas respectively using transmission currents $I_I$ and $I_O$, the interior antenna being separated from the transponder by a portion of a vehicle in which the vehicle base station resides;
at the transponder, measuring $x_I$, $y_I$ and $z_I$ vector components of the field strength emitted by the interior antenna, measuring $x_O$, $y_O$ and $z_O$ vector components of the received field strength emitted by the exterior antenna, and transmitting a signal indicative of the measured vector components to the vehicle base station;
at the vehicle base station, calculating superposition factors n and m for respectively applying to the measured signals from the interior and exterior antennas, based upon the transmitted signal indicative of the measured vector components;
at the vehicle base station, encrypting the superposition factors and transmitting the encrypted superposition factors to the transponder;
concurrently transmitting signals from each of the interior and exterior antennas to the transponder using the same phase, respectively using transmission currents $I_I * n$ and $I_{O1} * m$; and
at the transponder, measuring $x_S$, $y_S$ and $z_S$ vector components of a superposed signal including the signals from both antennas, and authenticating the transponder in response to each of $x_S$, $y_S$ and $z_S$ respectively being within an error-based range of the sum of the respective vector components of signals from each of the interior and exterior antennas, multiplied by the superposition factors.

7. The method of claim 6, wherein calculating superposition factors n and m includes calculating factors n and m with $[x_O*m, y_O*m, z_O*m]$ being equal to $[x_I*n, y_I*n, z_I*n +$ random value$]$, and where the superposed combined field strengths are above a noise level of the transmission.

8. The method of claim 6, wherein authenticating the transponder in response to each of $x_S$, $y_S$ and $z_S$ respectively being within an error-based range of the sum of the respective vector components of each of the interior and exterior antennas, multiplied by the superposition factors includes authenticating the transponder in response to $$x_{O1}*m + x_I*n - dx < x_{super} < x_{O1}*m + x_I*n + dx,$$

$$y_{O1}*m + y_I*n - dy < y_{super} < y_{O1}*m + y_I*n + dy, \text{ and}$$

$$z_{O1}*m + z_I*n - dz < z_{super} < z_{O1}*m + z_I*n + dz,$$

wherein dx, dy, dz are error factors corresponding to phase jitter, measurement accuracy, and driver current accuracy.

9. The method of claim 6, further comprising
normalizing the measured vector components $x_I$, $y_I$ and $z_I$, and $x_O$, $y_O$ and $z_O$,
subtracting the normalized vector components of the received field strength emitted by the interior antenna from the received field strength emitted by the exterior antenna, and
detecting a relay attack in response to the subtracted normalized vector components in each of the x, y and z directions respectively being less than expected errors in detected field strength in each of the x, y and z directions.

10. The method of claim 6, further including, enabling a circuit in the vehicle in response to the authentication of the transponder.

11. The method of claim 6, wherein
driving the interior and exterior antennas respectively using transmission currents $I_I$ and $I_O$ includes driving each of the antennas during a period when the other of the antennas is not driven, and
measuring $x_I$, $y_I$ and $z_I$ vector components of the field strength emitted by the interior antenna, and measuring $x_O$, $y_O$ and $z_O$ vector components of the received field strength emitted by the exterior antenna includes measuring $x_I$, $y_I$ and $z_I$ vector components of the field strength emitted by the interior antenna during a period when the exterior antenna is not driven, and measuring $x_O$, $y_O$ and $z_O$ vector components of the received field strength emitted by the exterior antenna during a period when the interior antenna is not driven.

12. The method of claim 6, wherein concurrently transmitting signals from each of the interior and exterior antennas to the transponder using the same phase includes transmitting the encrypted superposition factors to the transponder.

13. The method of claim 6, wherein transmitting a signal indicative of the measured vector components to the vehicle base station includes encrypting the measured vector components, and transmitting a signal indicative of the encrypted vector components.

14. The method of claim 6, wherein driving interior and exterior antennas includes driving two exterior antennas, and wherein the steps of measuring and using vector components includes separately measuring and using vector components from both of the exterior antennas.

15. The method of claim 6, further including, in response to a predefined number of unsuccessful access tries to the vehicle base station are made, detecting an attack and disabling an authentication-based function.

16. A system for authenticating a wireless communication, the system comprising:
   a transponder configured to receive and detect separate vector components of respective fields emitted by interior and exterior antennas of a vehicle, the interior antenna being separated from the transponder by a portion of the vehicle;
   a vehicle base station configured to
      drive the interior and exterior antennas respectively using first driving currents for communicating with the transponder, and
      concurrently drive each of the interior and exterior antennas using the same phase, respectively using the driving currents multiplied by superposition factors calculated for the interior and exterior antennas based upon the separate vector components;
   the transponder being further configured to detect superposed vector components of a superposed signal including signals from both antennas received at the transponder; and
   the vehicle base station being configured to authenticate the transponder in response to the detected superposed vector components for the superposed signal being within an error-based range of the sum of the separate vector components for each of the interior and exterior antennas as multiplied respectively by the superposition factors for the interior and exterior antennas.

17. The system of claim 16, wherein the vehicle base station is configured to calculate the superposition factors for the external and internal antennas with the product of the factor for the external antenna and the separate vector components for the external antenna being equal to the sum of a random value plus the product of the factor for the internal antenna and the separate vector components for the internal antenna.

18. The system of claim 16, wherein the vehicle base station is configured to enable at least one of an ignition circuit and an entry circuit in the vehicle in response to authenticating the transponder.

19. The system of claim 16, wherein
   the vehicle base station is configured to encrypt and transmit the superposition factors to the transponder, and
   the transponder is configured to detect and use the encrypted superposition factors to determine whether the superposed vector components are within the error-based range of the sum of the separate vector components for each of the interior and exterior antennas.

20. The system of claim 16, further including the interior and exterior antennas.

\* \* \* \* \*